(12) United States Patent
Schildt

(10) Patent No.: US 8,354,624 B2
(45) Date of Patent: Jan. 15, 2013

(54) DEVICE FOR CURING A PLASTIC MATERIAL

(75) Inventor: Rainer Schildt, Oederquart (DE)

(73) Assignee: Airbus Operations GmbH, Hamburg (DE)

( * ) Notice: Subject to any disclaimer, the term of this patent is extended or adjusted under 35 U.S.C. 154(b) by 537 days.

(21) Appl. No.: 12/625,043

(22) Filed: Nov. 24, 2009

(65) Prior Publication Data

US 2010/0133261 A1 Jun. 3, 2010

Related U.S. Application Data

(60) Provisional application No. 61/118,846, filed on Dec. 1, 2008.

(51) Int. Cl.
- *H05B 6/10* (2006.01)
- *H05B 6/36* (2006.01)
- *H05B 6/16* (2006.01)

(52) U.S. Cl. ........ 219/635; 219/672; 219/656; 219/676; 219/673

(58) Field of Classification Search .................. 219/635, 219/639, 672, 674, 656, 637, 640, 673, 676, 219/671, 652

See application file for complete search history.

(56) References Cited

U.S. PATENT DOCUMENTS

4,584,041 A * 4/1986 Lyman et al. ................. 156/156
2004/0157002 A1 8/2004 Bons et al.

FOREIGN PATENT DOCUMENTS

| DE | 101 08136 | 8/2002 |
| DE | 102005012522 | 10/2006 |
| DE | 102007000862 | 4/2009 |

OTHER PUBLICATIONS

German Office Action from DE 10 2008 044 208.9 dated Aug. 20, 2009.
Günter Benkowsky, *Grundlagen der Induktionserwärmung*, 5. Auflage, 1990, pp. 75-77 (with English translation included).

* cited by examiner

*Primary Examiner* — Chuong A. Luu
(74) *Attorney, Agent, or Firm* — Jenkins, Wilson, Taylor & Hunt, P.A.

(57) ABSTRACT

The invention relates to a device for curing a plastic material, in particular a sealing compound and/or a filling compound for tolerance adjustment or gap filling, respectively, wherein the plastic material is at least partly inserted in a gap area between two components, and wherein at least one of the components is made of a fiber reinforced plastic material, in particular of a carbon fiber reinforced epoxy resin. According to the invention the device is provided with at least one electromagnetic inductor for a locally defined heating of the gap area and for curing the plastic material arranged in the gap area. Due to the electromagnetic inductor which might be a linear inductor or a circular inductor a contact-less and fast curing of the plastic material is possible.

6 Claims, 3 Drawing Sheets

DEVICE FOR CURING A PLASTIC MATERIAL

CROSS-REFERENCE TO RELATED APPLICATIONS

This application claims the benefit of U.S. Provisional Application No. 61/118,846, filed Dec. 1, 2008, the entire disclosure of which is herein incorporated by reference.

FIELD OF THE INVENTION

The invention relates to a device for curing a plastic material, in particular a sealing compound and/or a filling compound, wherein the plastic material is at least partly inserted into a gap area between two components and wherein at least one of the components is made of a fiber reinforced plastic material, in particular of a carbon fiber reinforced epoxy resin. In modern aircraft construction fiber reinforced composite materials, for example carbon fiber reinforced epoxy resins are increasingly applied. For example, fuselage sections for the assembly of aircraft fuselages are manufactured of shell segments which are predominately made of fiber reinforced composite materials. Though, in contrary to the conventional aluminum construction, unavoidable production tolerances arise from the use of those composite materials which result from an undefined shrinking behavior when curing large-scaled components, for example. Although, tolerances occur in the case of the aluminum construction, which however are, due to the ductile properties of the used aluminum materials, compensable by pressing or pulling. However, this procedure is not applicable to composite materials due to their high brittleness after curing. Accordingly, when joining shell segments to fuselage sections and when subsequently forming complete aircraft fuselage cells by joining several fuselage sections other adjustment methods have to be done. For adjusting these production-related and unavoidable tolerance deviations, for gap filling and tolerance compensation between the two components that are to be joined normally a so-called "liquid shim"-material is used. This "liquid shim"-material normally is a curable plastic material on a two component basis, for example an epoxy resin which may be provided with further fillers and/or additive materials. Nowadays, the drying, respectively the curing of the "liquid shim"-material is normally done in ambient temperature, so that with the two component epoxy resin a chemical-physical related process time of several hours (normally between 4 and 9 hours) is given.

An accelerated curing of the shim material which is inserted into the unavoidable joining gaps is sporadically done by electrically heatable mats which are disposed in the joining area. However, these mats require a high energy application and lead to an uncontrolled heating of adjacent areas. Moreover, the temperature gradient which is reachable in the gap area by means of heating mats is not controllable without a time lag due to the thermic inertia of the heating mats and the application of the heating mats requires a high working effort.

SUMMARY OF THE INVENTION

It is an object of the device to avoid the afore-mentioned disadvantages of the known embodiments.

This object is reached by a device with the features of patent claim 1.

Thereby, that for a locally delimited heating of the gap area at least one electromagnetic inductor is provided, a spatial exactly defined and fast heating in the gap area of the components that are to be joined is possible and thereby and exactly delimited curing of the two component plastic material used as shim material is possible. Moreover, by switching-off the inductor the heating exposure may be exactly temporally limited. The inductor or the inductors are preferably energized with alternating currents in a frequency area between 10 and 13 kHz. Thereby, wattages beyond 1.0 KW are necessary which generally require water cooling of the inductor.

Preferably, the components are made of fiber reinforced plastic materials, in particular of carbon fiber reinforced epoxy resins. Plastic materials in a gap area between two metallic components that are to be joined are generally not curable by means of this device because on the one hand the heat dissipation is too high and on the other hand the screen effect of the metallic components at certain frequencies hinders an instantaneous heating of the inserted plastic material.

The carbon fibers within the CFRP-component should preferably run in intersected layers, so that within the reinforcement fiber assembly a variety of intersection points is established of which four adjacent of them respectively form an electrically conductible loop. In this loops the magnetic field generated by the inductors causes the development of a variety of small circular currents which circulate in the same direction which leads due to the little but nevertheless existing electrical conductivity of the carbon fibers to a sufficient inner ohmic heating of the composite components and thereby of the plastic material.

Alternatively, the device is provided with just one inductor or with a variety of inductors. When applying just one inductor it has to be displaced after working the respective section or area to an adjacent section, thereby increasing the working effort. To avoid sections that are only cured partly in case of this so-called "pilgrim step" method, normally an overlapping method of operation is necessary, thereby further increasing the time of effort. In contrast to that, a device which is provided with a variety of inductors working at the same time enables on the one hand a simultaneous curing of large area gap sections but on the other hand requires an increased constructional effort.

Particularly, the plastic material is a filling compound and/or a sealing compound. The filling compound, respectively the shim material is preferably an epoxy resin on a two component basis which optionally might be provided with further additive materials. As sealing compounds known polyurethanes on a two component basis are possible, for example.

A further advantageous embodiment of the device provides that the at least one inductor is in particular a linear inductor or a circular inductor. Thereby, when producing the device standard available inductors are usable and furthermore the spatial effective range is adaptable to the requirements.

A linear inductor is for example usable for curing elongated gap sections due to the resulting geometry of the magnetic field, whereas a horse shoe inductor or circular inductor is usable for heating of laminar gap areas. Helical inductors are in particular usable for curing circular-shaped gap areas. Basically, the resulting geometry of the magnetic field and thereby the field of action of the inductor, that means the shape of the specially limited zone in which the defined heating of the plastic material for curing occurs is changeable in vast ranges. Preferably, the device is provided with universal fasteners for including a variety of different types of inductors, so that a fast change for an adaption of the device to different spatial conditions is possible. For achieving an optimal curing result, the geometry of the inductor and the magnetic field generated by it should be adjusted to the gap section as exactly as possible.

A further advantageous embodiment of the device provides that a distance between the at least one inductor and the gap area is between 0 mm and 30 mm. Hereby, a flexible use of the device is possible without that the compliance of exact clearances is necessary. Normally, when increasing the clearance, a power increase of the inductors is necessary. This is producible by an amperage increase in the inductors, for example.

According to another preferable embodiment of the device, a material thickness of the plastic material that is to be cured may be up to 5 mm. Hereby a universal application of the device even at high material thicknesses of the shim material is possible.

According to another advantageous embodiment of the device, in the plastic material a temperature of between 40° C. and 90° C. is reachable by means of the inductor. Due to these exactly adjustable temperatures a fast curing occurs in least than one hour. The undercutting or the transgression of a predetermined curing temperature is for example avoidable by preliminary empirical determined characteristic curves at which the temperature reached inside the plastic material is measured in relation of the according amperage and/or the frequency of the alternating feeding current of the inductors. When the inductors are operated or controlled by means of power electronics, respectively, in the area of this characteristic curves, a target curing temperature is sustainable over the whole curing time with sufficient accurateness. A direct measurement of the temperature inside the plastic material which normally requires the embedding of a variety of temperature measurements sensors is therefore dispensable.

A further preferred embodiment of the invention provides that at least one component is at least partly provided with a metallic lamination, in particular with a net or a mesh. Thereby, the thermal effect of the inductors is increasable because inside of the lamination strong eddy currents are generated which cause an ohmic heating of the component and thereby cause an indirect temperature increase of the plastic material.

A further development of the device provides that the plastic material is provided with metallic particles, in particular with aluminum particles. Thereby, an instantaneous heating of the plastic material which is placed between the components is possible because by means of the inductors eddy currents are generated directly in the plastic material which leads to a direct inner warming of the plastic material.

Further advantageous embodiments of the device are explained in the further patent claims.

DESCRIPTION OF EXEMPLARY EMBODIMENTS

Figure 1:
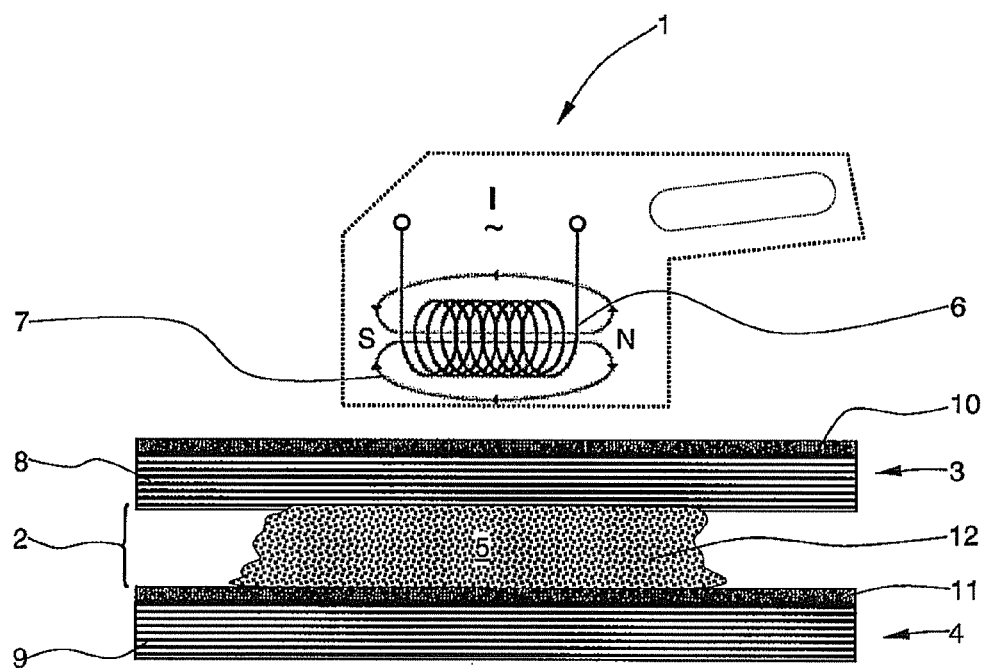
FIG. 1 shows a schematic illustration of a device for curing a plastic material which is placed in a gap area between two components that are to be joined.

In the drawing same constructional elements are provided with the same reference numbers, respectively.

FIG. 1 shows the principal buildup of a device for curing plastic materials in a gap area between two components. A device 1 comprises amongst other a gap area 2 between two components 3, 4, wherein a plastic material 5, in particular a sealing compound or a filling compound is at least partly inserted into the gap area 2. Above the first component 3 an inductor, which is exemplary formed as a linear inductor 6 is arranged for the generation of a magnetic field 7 which interfuses the components 3, 4 as well as the plastic material 5 in the gap area 2. Instead of the linear inductor 6 it is possible to apply—in accordance to the application—horse shoe ("C") induction heads, wave induction heads, spiral inductors or other configurations of inductors. However, for the simultaneous curing of a transverse seam area between two fuselage sections a circular inductor is necessary. A current I of an alternating current which is used for feeding the linear inductor 6 is chosen in that way that a temperature between 40° C. and 90° C. in the plastic material 5 that is to be cured is set up over a time period of up to one hour. The used plastic materials 5 are thermosets, for example with the denotations EA 9394 A/B of Henkel® Company, Redux 870 A/B of Hexcel® Company, EA 9394.2 of Henkel® Company or Epibond 1590-3 NB of Huntsmann® Company. Alternatively, the plastic material 5 is a sealing compound, for example a polyurethane-plastic material on a two component basis. In this constellation normally a temperature of about 50° C. in the area of the sealing compound is sufficient for accelerated curing.

When operating the linear adapter 6, in particular in case of a large-area gap area 2 which is not interfused simultaneously by the magnetic field 7 of the linear inductor 6, a positioning arrangement is advantageous by means of which the linear inductor 6 is automatically guidable over the gap area 2 in defined paths. Thereby, a sufficient exposure time of the linear inductor 6 over the gap area 2 shall be provided for causing a sufficient thermal curing of the plastic material 5. Alternatively, the linear inductor 6—as shown in FIG. 1 by means of the dotted outline—may comprise a handle, for example a grab handle, which enables a manual operation of the linear inductor 6. In this constellation, the linear conductor 6 preferably is provided with a laser sighting mechanism for contactless optical visualization of the spatial sphere of action of the magnetic field 7 which is generated by the linear inductor 6 on the components 3, 4. Thereby, a complete curing of the plastic material 5 is ensured.

Both components 3, 4 are substantially made of a layer 8, 9 which is made of a carbon reinforced epoxy resin (so-called "prepreg material"), respectively, wherein the reinforcement fibers which are embedded in a not illustrated plastic matrix intersect each other in layers under an angle of up to 90° under the formation of intersection points. The intersection points between the reinforcement fibers work as electrically conducting points which means that, over the intersection points between the reinforcement fibers a current, even if it is small, may flow. Thereby, for example squared, rectangular or rhombic loops with four intersection points are provided, respectively. Due to the at least rudimental existing conductivity of the carbon fibers, eddy currents may be induced in the loops due to the alternating magnetically field generated by the linear inductor 6 which leads to a direct ohmic heating of the layers 8, 9. Moreover, the components 3, 4 might be provided with a lamination 10, 11 at least partly on one side, respectively, which is made of a conducting material, like for example a copper cloth, a perforated copper foil and/or a copper mesh. Inside of the electrical conducting laminate 10, 11 due to the action of the alternating magnetic field which is induced by the linear inductor 6 likewise eddy currents are generated which lead to a direct thermic heating of the laminations 10, 11 and thereby an indirect heating of the plastic material 5 by means of heat conduction processes. Preferably, the plastic material likewise is provided with a multitude of electrical conducting metallic particles of which one particle 12 is representatively provided with a reference sign. By the application of the particles 12 the electrical conductivity of the plastic material 5 is increased so much that just by the particles a temperature of 40° C. is reachable in the plastic material 5. In particular for weight reasons the plastic material 5 is preferably provided with particles made of a light weight aluminum alloy. The plastic material itself, respectively the matrix that encloses the particles 12 is preferably made of a thermal curable two component epoxy resin system. However, for the complete curing of the plastic material 5 the intrinsic conductivity which is reached by the inserted aluminum particles is not sufficient. The application of the lamination 10, 11 illustrated exemplary is not compulsory for the functionality of the device 1, because the heating of the plastic material 5 due to the ohmic heating effect of the carbon fibers that are contained in the components 3, 4 in combination with the thermal self-heating due to the electrical conducting particles 12 is normally sufficient for the curing process of the plastic material 5. Differing from the presentation in FIG. 1 the laminations 10, 11 might be provided on an upper side and/or bottom side of the components 3, 4. However, preferably the laminations are disposed—as shown—on the upper side of the components, because the laminations, in particular in form of a copper mesh, a copper lamination or a copper net primary serve as an arrangement for lightning protection. In the case that the components 3, 4 are not arranged overlapping as shown but are arranged adjacent to each other butt to butt and are joined on their bottom side with a transverse seam strap, the transverse seam strap normally does not have a lamination.

Figure 2:
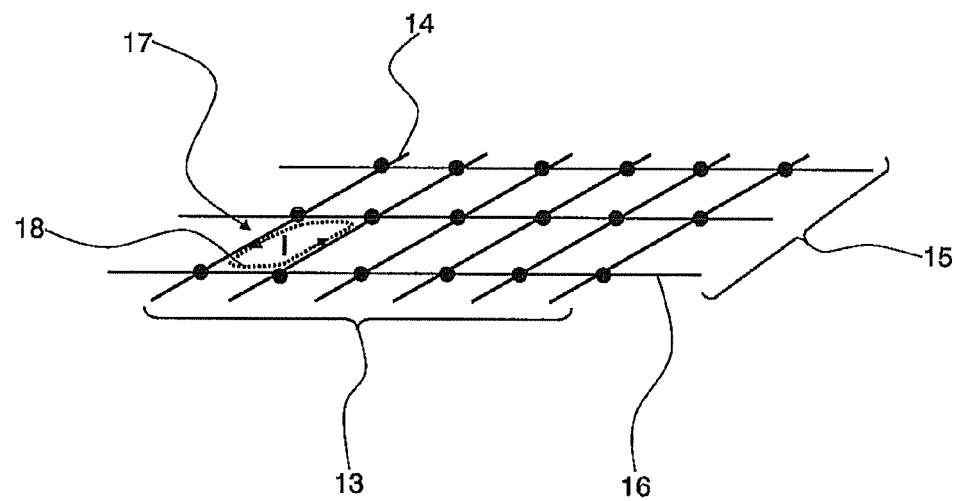
FIG. 2 shows a schematic illustration of the distribution of reinforcement fibers within the components which define or respectively form the gap area.

FIG. 2 schematically shows the distribution of reinforcement fibers in a component for the generation of loops. Within a not shown resin matrix of the component 3, 4 in a first layer 13 run a plurality of horizontal reinforcement fibers or strands of reinforcement fibers, respectively, of which merely one reinforcement fiber 14 is provided with a reference sign representatively for the rest. In a second layer 15 likewise runs a plurality of reinforcement fibers, wherein the reinforcement fibers inside the layers intersect each other with an angle of up to 90°. A reinforcement fiber 16 in the second layer 15 for example intersects with the reinforcement fiber 14 in the first layer 13 with an angle of about 90°, whereby a loop 17 is generated with all together four intersection points indicated by small black circles. Because the alternating magnetic field which is generated by the linear inductor 6 interfuses the loop 17 a circular current 18 is generated in the loop 17. The circular current 18 leads to a slightly ohmic heating of the loop 17 because of the slight, but nevertheless existing, electrical conductivity of the reinforcement fibers which are preferably made of carbon fiber filaments and carbon fiber strands, respectively. This procedure repeats over the whole area of the components 3, 4 which is interfused by the magnetic field of the linear inductor 6 and in all loops of the reinforcement fiber arrangement, so that in this area of the components 3, 4 adjacent plastic material 5 is sufficiently heated and thereby thermally cured.

Figure 3:
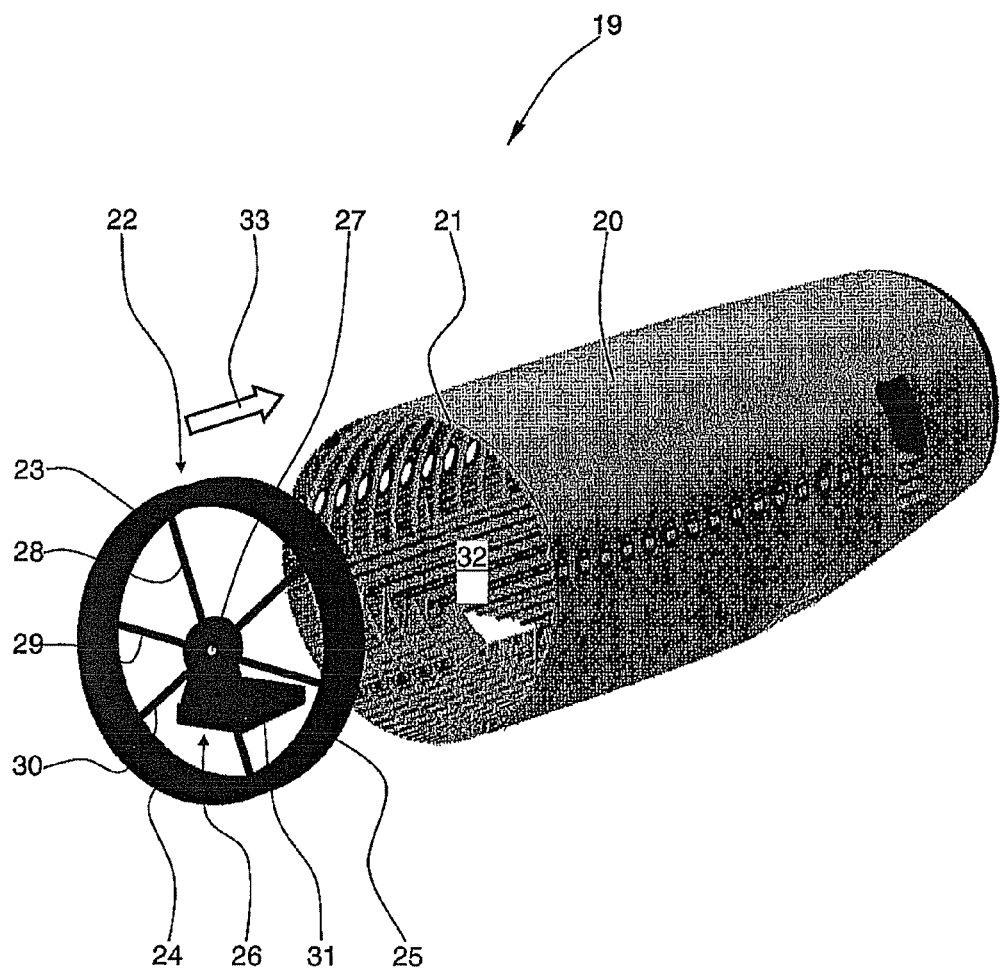
FIG. 3 shows a schematic illustration of a device for a simultaneous curing of a complete transverse seam between fuselage sections that are to be joined.

FIG. 3 illustrates an embodiment of a device which enables a simultaneous curing of a filling compound, respectively of a sealing compound which is inserted in a circumferential transverse seam area of a fuselage section. To a (rear) fuselage section 20 as a first component a further, not illustrated, fuselage section as a second component is attached. The device 19 comprises a circular inductor 22, the outer diameter of which—minus an air gap for tolerance adjustment—is approximately adapted to the section dimensions, respectively the section geometry of the fuselage section 20 in the transverse seam area. In the shown embodiment the circular inductor 22 is assembled of three adjacent 120°-segments 23 to 25. The segments 23 to 25 may be made of a multitude of C-shaped electromagnets which are arranged adjacent to each other and which follow a local curvature of the fuselage section, wherein the magnetic field lines run out from the pole shoes of the electromagnets and interfuse the outer skin of the fuselage sections approximately perpendicular (in a radial direction) and run back to electromagnets approximately parallel to the circumference of the fuselage section. To reach the desired heating of the complete transverse seam area 21 by means of the circular inductor 22 to a temperature between 40° C. and 90° C. the circular inductor 22 has to be feeded with a high electrical power. Due to this high power input normally water cooling has to be provided. The electrical powers that are necessary for operating the circular inductor 22 may come to clearly more than 1000 kW at a frequency between 10 kHz and 30 kHz.

Due to the normally large scaled section dimensions of the fuselage sections that are to be joined which may have, dependent on the type of the aircraft, an inner circumference of up to 25 m and therefore require a circular inductor 22 with merely a corresponding auto diameter it might be necessary to divide this circular inductor 22 in more than this segments 23 to 25 exemplary shown. Moreover, by a higher number of segments the water cooling of the individual inductor segments which is normally necessary may be structurally simplified significantly, because for each segment an inflow and an outflow with a smaller diameter is sufficient. By means of the segmentation of the circular inductor 22 the electrical power which is necessary for feeding the individual circular inductor segments is reduced and the smoothly stepped regulation of the inductor segments by means of a power electronic is simplified. Further, the segmentation of the circular inductor 22 enables an adaption to locally different sized curvature grades of the fuselage sections that are linked to each other in the transverse seam area and further an adaption to different conditions in a modular design principal is possible. The modular design principally enables by means of the combination of an assortment of inductor segments out of a delimited pool of standardized inductor segments a flexible combination of the circular inductor 22, wherein the segments are adapted in an easy manner to different section geometries and section dimensions of fuselage sections. Individual circular inductor segments are joined to each other by means of a connector system, wherein optionally an interlocking system might be provided. In the transverse seam area 21 devices for arrangement, alignment and intermittent fixation of the circular inductor segments might be provided on the inner side of the fuselage sections 20.

The circular inductor 22 might further comprise an optional central fixation 26 which is provided with all together three bars 28 to 30 which intersect in a center for simplifying the positioning inside of the fuselage section 20.

In the area of the center 27 a positioning device 31, respectively a base plate is arranged which serves for alignment and for positioning of the circular inductor 22 inside an inner area 32 of the fuselage section 20.

As prearrangement for the application of the device 19, in an imaginable alternative first of all the transverse seam area 21 of the fuselage section 20 is provided with the curable plastic material for gap filling and/or tolerance adjustment. Subsequently, the completely mounted circular inductor 22 is moved by means of the positioning device 31 into the inner area 32 of the fuselage 20 which is still open on one side in direction of the arrow 33, such that the complete transverse seam area 21 is preferably completely interfused by the alternating magnetic field of the circular inductor 22. Finally, the fuselage section which is to be joined is aligned in relation to the fuselage section 20 and pushed against it, respectively, and screwed and/or riveted together with the fuselage section 20 by means of a butt to butt connection under application of a transverse seam strap. Alternatively, an overlapping connection may be carried out without a transverse seam strap.

After the joining process is at least partly finished, that means the fuselage sections are provisorily tacked for the achievement of a sufficient fixation of the location, by means of the circular inductor 22, the plastic material inserted into the gap area between the fuselage sections is curable. Finally, the circular inductor 22 might be demounted into its three segments 23 to 25 and might be removed including the positioning device 31 and the bars 28 to 30 from the joined fuselage sections.

In the case that the fuselage sections that are to be joined have to be moved away from each other before as well as after the insertion and the curing of the plastic material (shim material) which is necessary for gap filling, the circular inductor might be mounted into the fuselage sections which are already positioned and aligned to each other. Since the fuselage sections are provided with the passenger and cargo floor at this moment, supporting, mounting and stapling possibilities arise for the individual conductor segments and the complete circular inductor 22, respectively. The central fixation 26 with the positioning device 31 and the bars 28 to 30 being, respectively the base plate might be omitted if the fuselage sections are provided with arrangements in the transverse seam area 21 (e.g. rib fasteners for inductor segments) for the intermittent fastening of the circular inductor segments.

Figure 4:
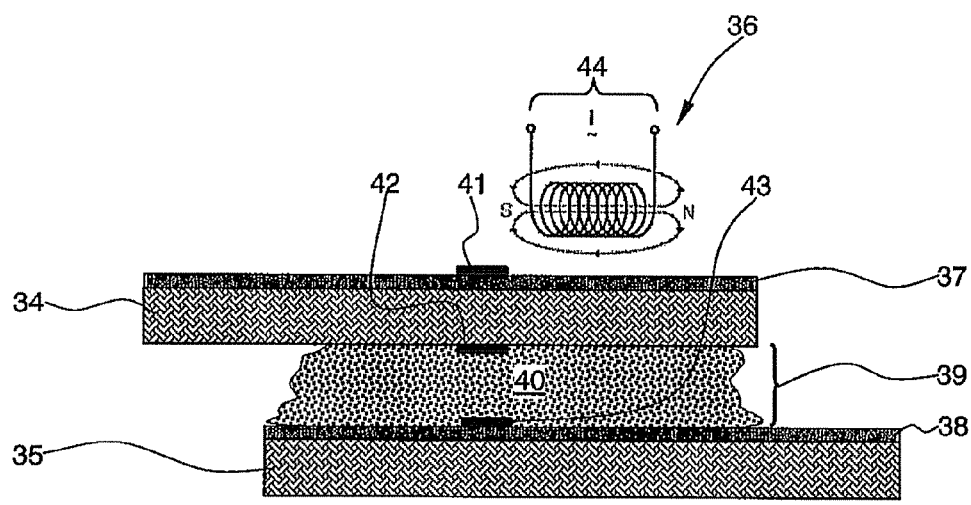
FIG. 4 shows a schematic experimental setup for evaluation of a temperature gradient in two inductive heated at least partly overlapping and laminated fiber composite components.

FIG. 4 shows a sectional view through an experimental setup for determining a temperature gradient which results from an inductive heating of two overlapping components which are provided with a lamination on their tops. An upper component 34 and a lower component 35 overlap each other in a transverse seam area 36 which build-up therefore in principle corresponds substantially to a transverse seam area between two fuselage sections of an air plane that are to be joined. The two components 34, 35 are provided with a lamination 37, 38, respectively, on their tops which preferably is an electrical conducting copper cloth, in particular a copper mesh for lighting protection. The two components 34, 35 are preferably made of a carbon fiber reinforced epoxy resin. According to the illustration of FIG. 1 in a gap area 39 a plastic material 40 is provided. Three temperature sensors 41 to 43 serve to collect a temperature increase in the components 34, 35 which is generated by means of an electromagnetic inductor 44. The temperature sensor 41 is arranged on the lamination 37, the temperature sensor 42 is arranged on the lower side of the upper component 34 and the third temperature sensor 43 is positioned on the lamination 38. A chronological gradient of the temperatures collected by the temperature measuring locations 41 to 43 in the transverse seam area according to the afore-described experimental setup is summarized in the chart according to FIG. 5. The number and/or the positioning of the three temperature sensors 41 to 43 is chosen just exemplary, that means in a practical accomplishment of a measurement of the temperature gradient normally a larger number and in particular a better spatial disposition of the temperature sensors is necessary to reach meaningful results.

Figure 5:
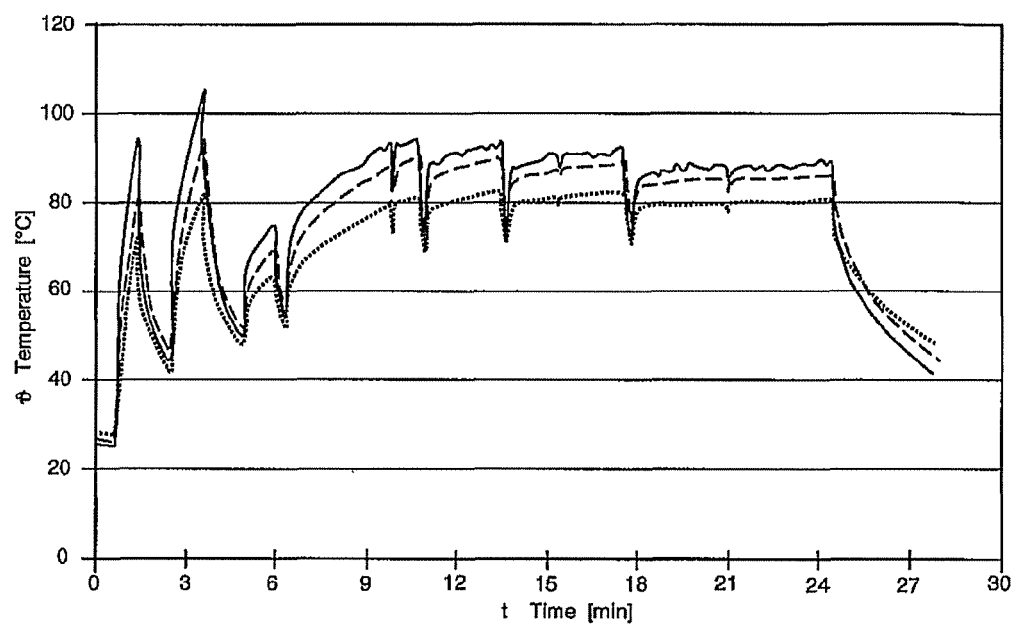
FIG. 5 shows a diagram with the temperature gradient that has been identified by means of the experimental setup according to FIG. 4.

FIG. 5 illustrates temperature gradients that are measured by means of the experimental setup of FIG. 4 during inductive heating of two plate shaped components that overlap each other in a seam or transfer seam area, respectively, with plastic material 40 or shim material, respectively, inserted in the overlapping area. On the abscissa the time in minutes is plotted, whereas on the ordinate the temperature $\theta$ in ° C. measured by means of the temperature sensors 41 to 43 at the particular points in time is plotted. The gradient illustrated with a continuous line corresponds to the temperature gradient measured by means of the upper temperature sensor 41, whereas the curve which is illustrated by a dashed line relates to the gradient measured by means of the middle temperature sensor 42 and the curve drawn with a dotted line corresponds to the temperature gradient which has been measured by means of the lower temperature sensor 43. It is recognizable from the chart of FIG. 5 that by the inductive heating by means of the inductor 44 in the area of the upper temperature sensor 41 in relation to the two other temperature sensors 42, 43 the highest temperatures are reachable but in the area of the lower temperature sensor 43—independent of the existence of a metallic lamination 37, 38 on the components 34, 35—nevertheless temperatures of up to 90° C. are reachable which are optimal for the accelerated curing of the plastic material 40. Summing up it should be noted that by means of the inductor 44 the two fiber composite components 34, 35 are heatable inductively independent of the existence of the metallic laminations 37, 38 for accelerated curing of the plastic material 40. Moreover, the astonishing result is produced, that the laminations 37, 38 even improve the heating effect of the inductor 44 in the area of the preferably reinforcement-free plastic material 40.

LIST OF REFERENCE NUMERALS 1 device
2 gap area
3 first component
4 second component
5 plastic material (adjustment compound/filling compound/sealing compound)
6 linear inductor (inductor head, inductor)
7 magnetic field
8 layer (CFRP-material)
9 layer (CFRP-material)
10 lamination
11 lamination
12 particle
13 first layer
14 reinforcement fiber
15 second layer
16 reinforcement fiber
17 loop
18 eddy current
19 device
20 fuselage section
21 transverse seam area
22 circular inductor 23 120°-segment
24 120°-segment
25 120°-segment
26 central fixation
27 center
28 bar
29 bar
30 bar
31 positioning device
32 inner area (fuselage section)
33 arrow
34 first component
35 second component
36 transverse seam area
37 lamination
38 lamination
39 gap area
40 plastic material (adjustment compound/filling compound/sealing compound)
41 temperature sensor
42 temperature sensor
43 temperature sensor
44 linear inductor

The invention claimed is:

1. A device for curing a plastic material wherein the plastic material is inserted at least partly in a transverse seam area between a fuselage section and a further fuselage section that is to be joined to the fuselage section to form an aircraft fuselage cell, wherein at least one of the fuselage sections is made of a carbon fiber reinforced epoxy resin, wherein for a locally defined heating of the transverse seam area at least one electromagnetic circular inductor is provided which is made of a multitude of segments for enabling a simultaneous hardening of the transverse seam area, wherein the circular inductor is arranged in an inner area of the fuselage section, and wherein the segmentation of the circular inductor enables an adaption to locally different sized curvature grades of the fuselage sections that are linked to each other in the transverse seam area.

2. The device according to claim 1, wherein a gap between the at least one inductor and the transverse seam area is between 9 mm and 30 mm.

3. The device according to claim 1, wherein a material thickness of the plastic material is up to 5 mm.

4. The device according to claim 1, wherein by the at least one circular inductor a temperature of between 40 ° C. and 90 ° C. is reachable in the plastic material.

5. The device according to claim 1, wherein at least one fuselage section is at least partly provided with a metallic lamination.

6. The device according to claim 1, wherein the plastic material is provided with metallic particles, in particular with aluminum particles.

* * * * *